(12) United States Patent
Wang

(10) Patent No.: US 12,206,583 B2
(45) Date of Patent: Jan. 21, 2025

(54) DATA TRANSMISSION METHOD AND APPARATUS, DEVICE, STORAGE MEDIUM, AND COMPUTER PROGRAM PRODUCT

(71) Applicant: Beijing Baidu Netcom Science Technology Co., Ltd., Beijing (CN)

(72) Inventor: Chenfei Wang, Beijing (CN)

(73) Assignee: BEIJING BAIDU NETCOM SCIENCE TECHNOLOGY CO, LTD., Beijing (CN)

( * ) Notice: Subject to any disclaimer, the term of this patent is extended or adjusted under 35 U.S.C. 154(b) by 314 days.

(21) Appl. No.: 17/902,522

(22) Filed: Sep. 2, 2022

(65) Prior Publication Data

US 2022/0417154 A1 Dec. 29, 2022

(30) Foreign Application Priority Data

Nov. 25, 2021 (CN) .......................... 202111412886.7

(51) Int. Cl.
*H04L 47/12* (2022.01)
(52) U.S. Cl.
CPC .................................... *H04L 47/12* (2013.01)
(58) Field of Classification Search
None
See application file for complete search history.

(56) References Cited

U.S. PATENT DOCUMENTS

| 11,106,634 | B1* | 8/2021 | Stark | .................... | H04L 63/108 |
| 2006/0062224 | A1* | 3/2006 | Levy | ..................... | H04L 47/326 370/395.6 |

| 2012/0158990 | A1 | 6/2012 | Losio et al. |
| 2013/0291032 | A1 | 10/2013 | Nilsson et al. |
| 2016/0301935 | A1 | 10/2016 | McCarthy |
| 2021/0297509 | A1* | 9/2021 | Thubert ............ H04W 72/1221 |

FOREIGN PATENT DOCUMENTS

| CN | 107750001 A | 3/2018 |
| CN | 111327650 A | 6/2020 |
| CN | 111917661 A | 11/2020 |
| CN | 113489575 A | 10/2021 |
| KR | 20180106040 A | 10/2018 |

OTHER PUBLICATIONS

Bhatangar et al., "Multihop Concurrent Big Data Sharing via Multithreading using Blockchain on a Decentralized Network", Dec. 18, 2020, IEEE, 2020 2nd International Conference on Advances in Computing, Communication Control and Networking (ICACCCN) (2020, pp. 885-890) (Year: 2020).*

* cited by examiner

*Primary Examiner* — Davoud A Zand
(74) *Attorney, Agent, or Firm* — Seed IP Law Group LLP

(57) ABSTRACT

A data transmission method and apparatus, an electronic device, a computer readable storage medium, and a computer program product are provided. The method includes: receiving to-be-transmitted data currently transmitted from a data source node; determining an average receiving interval and an average transmitting interval based on a historical data receiving interval and a historical data transmitting interval; determining the splitting transmission number based on the average receiving interval and the average transmitting interval; obtaining a plurality of data fragments based on a data size of the to-be-transmitted data and the splitting transmission number; and sequentially and uniformly transmitting the data fragments to a next-level node within a subsequent period with a duration being the average receiving interval.

20 Claims, 5 Drawing Sheets

DATA TRANSMISSION METHOD AND APPARATUS, DEVICE, STORAGE MEDIUM, AND COMPUTER PROGRAM PRODUCT

CROSS-REFERENCE TO RELATED APPLICATION

The present application claims the priority of Chinese Patent Application No. 202111412886.7, titled "DATA TRANSMISSION METHOD AND APPARATUS, DEVICE, STORAGE MEDIUM, AND COMPUTER PROGRAM PRODUCT, AND PROGRAM PRODUCT," filed on Nov. 25, 2021, the content of which is incorporated herein by reference in its entirety.

BACKGROUND

Technical Field

The present disclosure relates to the technical field of data processing, specifically relates to the technical field of media cloud such as uniform data transmission, and more specifically relates to a data transmission method and apparatus, an electronic device, a computer readable storage medium, and a computer program product.

Description of the Related Art

In some video data transmission scenarios, streaming video data received by a data receiving node is not transmitted at a relatively uniform speed, but more video data will be transmitted within a shorter period of time (for example, within 10 ms) every a longer period of time (for example, more than 200 ms).

Video stream data is transmitted from a source node, forwarded by several relay nodes, and is finally transmitted to terminals for viewing by video viewers. If the relay nodes directly forward the video stream data without processing, data received by the next data receiving node will still possess pulse features. The flow of such pulsed data across the whole network will cause several problems, thereby reducing a service quality, and increasing costs.

BRIEF SUMMARY

Embodiments of the present disclosure present a data transmission method and apparatus, an electronic device, a computer readable storage medium, and a computer program product.

Some embodiments of the present disclosure present a data transmission method, including: receiving to-be-transmitted data currently transmitted from a data source node; determining an average receiving interval and an average transmitting interval based on a historical data receiving interval and a historical data transmitting interval; determining a splitting transmission number based on the average receiving interval and the average transmitting interval; obtaining a plurality of data fragments based on a data size of the to-be-transmitted data and the splitting transmission number; and sequentially and uniformly transmitting the data fragments to a next-level node within a subsequent period with a duration being the average receiving interval.

Some embodiments of the present disclosure present a data transmission apparatus, including: a to-be-transmitted data receiving unit configured to receive to-be-transmitted data currently transmitted from a data source node; an average interval determining unit configured to determine an average receiving interval and an average transmitting interval based on a historical data receiving interval and a historical data transmitting interval; a splitting transmission number determining unit configured to determine a splitting transmission number based on the average receiving interval and the average transmitting interval; a data fragment acquiring unit configured to obtain a plurality of data fragments based on a data size of the to-be-transmitted data and the splitting transmission number; and a uniformly transmitting unit configured to sequentially and uniformly transmit the data fragments to a next-level node in a subsequent period with a duration being the average receiving interval.

Some embodiments of the present disclosure provide an electronic device, including: at least one processor; and a memory communicatively connected to the at least one processor; where the memory stores instructions executable by the at least one processor, and the instructions are executed by the at least one processor, such that the at least one processor can implement the above data transmission method.

Some embodiments of the present disclosure provide a non-transitory computer readable storage medium storing computer instructions, where the computer instructions are used for causing a computer to implement the above data transmission method.

Some embodiments of the present disclosure provide a computer program product including a computer program, where the computer program, when executed by a processor, can implement the above data transmission method.

It should be understood that contents described in the SUMMARY are neither intended to identify key or important features of embodiments of the present disclosure, nor intended to limit the scope of the present disclosure. Other features of the present disclosure will become readily understood with reference to the following description.

BRIEF DESCRIPTION OF THE DRAWINGS

After reading detailed descriptions of non-limiting embodiments with reference to the following accompanying drawings, other features, objectives, and advantages of the present disclosure will become more apparent.

DETAILED DESCRIPTION

Example embodiments of the present disclosure are described below with reference to the accompanying drawings, including various details of the embodiments of the present disclosure to contribute to understanding, which should be considered merely as examples. Therefore, those of ordinary skills in the art should realize that various alterations and modifications may be made to the embodiments described here without departing from the scope and spirit of the present disclosure. Similarly, for clearness and conciseness, descriptions of well-known functions and structures are omitted in the following description. It should be noted that the embodiments in the present disclosure and the features in the embodiments may be combined with each other on a non-conflict basis.

In the technical solution of the present disclosure, the collection, storage, use, processing, transfer, provision, and disclosure of personal information of a user involved are in conformity with relevant laws and regulations, and do not violate public order and good customs.

Figure 1:
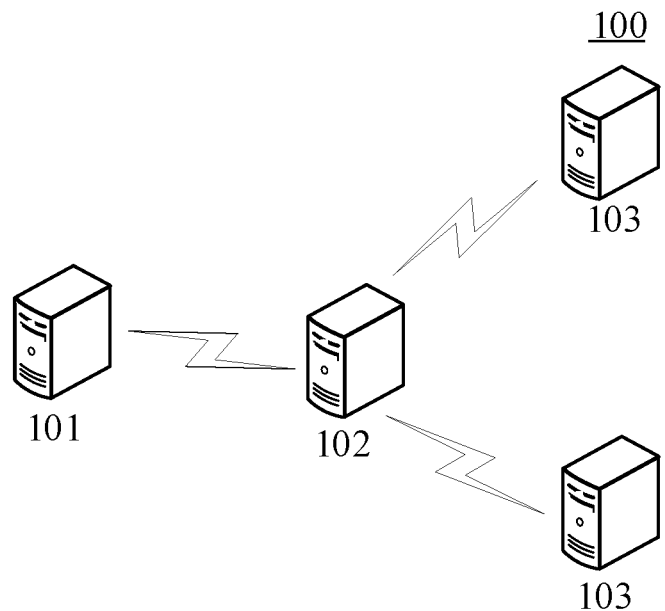
FIG. 1 is an exemplary system architecture in which embodiments of the present disclosure may be implemented.

FIG. 1 shows an exemplary system architecture 100 in which a data transmission method and apparatus, an electronic device, and a computer readable storage medium of embodiments of the present disclosure may be implemented.

As shown in FIG. 1, the system architecture 100 is a cluster or network (e.g., CDN (Content Delivery Network)) including a plurality of nodes. Data transmission between nodes usually relies on the network. Each node may further establish a data transmission channel with a further user terminal, and transmit, in response to a data acquiring request sent from the user terminal, corresponding data to the user terminal. If a current node does not store requested data of the user terminal, the current node may further acquire the requested data from other nodes storing the requested data.

Specifically, the system architecture 100 may include a data source node 101, a primary relay node (also referred to as a first relay node) 102, a secondary relay node 103, and subsequent multi-level relay nodes that are not shown but may actually exist. The primary relay node 102 is named since it is directly connected to the data source node 101, i.e., the data source node 101 can only transmit data to the primary relay node 102 firstly, then re-forward the data to the secondary relay node 103 through a data transmission channel between the primary relay node 102 and the secondary relay node 103, and likewise, finally transmit the data to a destination device (which may be a relay node with a certain level, or may be a user terminal connected to a relay node with a certain level). Data transmission may be implemented by wired or wireless transmission between nodes.

Various applications for implementing actual functions may be installed on the above nodes, such as a data transmission application, a to-be-transmitted data sorting application, and an instant messaging application.

The data source node 101, the primary relay node 102, and the secondary relay node 103 may be hardware, or may be software. When the data source node 101, the primary relay node 102, and the secondary relay node 103 are hardware, they may be electronic devices having a data storage power and a data processing power, including but not limited to a tablet computer, a notebook computer, a desktop computer, a single server, or a server cluster composed of a plurality of servers, or the like. When the data source node 101, the primary relay node 102, and the secondary relay node 103 are software, they may be installed in the above-listed electronic devices, and may be implemented as a plurality of software programs or software modules, or may be implemented as a single software program or software module. This is not specifically limited here.

The primary relay node 102 may provide various services by various built-in applications. Taking a to-be-transmitted data arrangement application that can provide a uniform data transmission service for received to-be-transmitted data as an example, the primary relay node 102 may achieve the following effects when running the to-be-transmitted data sorting application: first receiving to-be-transmitted data currently transmitted from the data source node 101; then determining an average receiving interval and an average transmitting interval based on a historical data receiving interval and a historical data transmitting interval; then determining the splitting transmission number based on the average receiving interval and the average transmitting interval; then obtaining a plurality of data fragments based on a data size of the to-be-transmitted data and the splitting transmission number; and finally sequentially and uniformly transmitting the data fragments to two secondary relay nodes 103 within a subsequent period with a duration being the average receiving interval.

The data transmission method provided in subsequent embodiments of the present disclosure is generally executed by the primary relay node 102, thereby avoiding pulsed data transmission at the source of the data transmission with the help of the level of the primary relay node 102 being only adjacent to the data source node 101. Accordingly, the data transmission apparatus may also be provided in the primary relay node 102. It should be particularly noted that, in some application scenarios, the provided data transmission solution may also be delivered to a secondary relay node or other-level relay nodes based on actual requirements.

It should be understood that the numbers of data source nodes, primary relay nodes, and secondary relay nodes in FIG. 1 are merely illustrative. Any number of data source nodes, primary relay nodes, and secondary relay nodes may be provided based on actual requirements.

Figure 2:
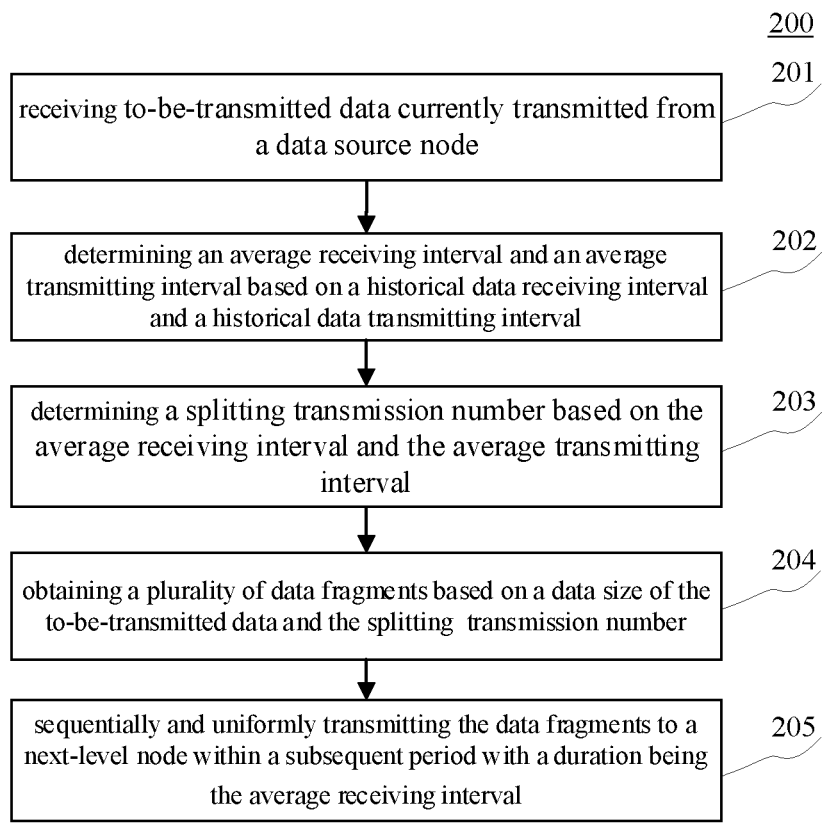
FIG. 2 is a flowchart of a data transmission method provided in an embodiment of the present disclosure.

Referring to FIG. 2, FIG. 2 is a flowchart of a data transmission method provided in an embodiment of the present disclosure, where the flowchart 200 includes the following step 201 to step 205.

Step 201: receiving to-be-transmitted data currently transmitted from a data source node.

This step is intended to receive, by an executing body (e.g., the primary relay node 102 shown in FIG. 1) of the data transmission method, the to-be-transmitted data currently transmitted from the data source node (e.g., the data source node 101 shown in FIG. 1).

The data source node refers to a node that originally transmits the to-be-transmitted data, i.e., a data source node where the to-be-transmitted data is originally stored. The currently transmitted to-be-transmitted data is data that is distinguished from to-be-transmitted data that is not currently transmitted (for example, transmitted last time).

Step 202: determining an average receiving interval and an average transmitting interval based on a historical data receiving interval and a historical data transmitting interval.

Based on step 201, this step is intended to determine, by the executing body, the average receiving interval and the average transmitting interval based on historical actual transceiving conditions, so as to use the determined average receiving interval as a predicted time interval between current data receiving and next data receiving.

Specifically, the average receiving interval or the average transmitting interval may be determined by computing the average receiving interval based on a greater number of data receptions for the purpose of improving the accuracy. Further, it is possible to compute the average receiving interval preferably based on several numbers of data receptions close to the current data receiving considering that data transmission is usually uncertain. The average transmitting interval is determined similarly, which will not be repeated here.

Step 203: determining a splitting transmission number based on the average receiving interval and the average transmitting interval.

Based on step 202, this step is intended to compute, by the executing body, the splitting number transmission based on the average receiving interval and the average transmitting interval. The splitting transmission number means the number of data portions obtained in splitting currently received to-be-transmitted data, such that the splitting transmission number of data portions are uniformly transmitted to achieve uniform data transmission.

The splitting transmission number is computed based on the average receiving interval and the average transmitting interval, because the transmitting interval is relatively shorter compared with the receiving interval which is longer. The receiving interval represents a duration between two adjacent data receptions, and the transmitting interval represents a duration between two adjacent data transmissions. Therefore, in order to eliminate the pulsed data transmission and achieve uniform data transmission in the present disclosure, the transmitting interval should be significantly smaller than the receiving interval. Therefore, when the average transmitting interval is used as a numerator and the average receiving interval is used as a denominator, the quotient will be a value less than 1, i.e., the value of the quotient may be understood as a ratio of a duration between two data transmissions to a duration between two data receptions. Then, the ratio may be converted into the splitting transmission number.

For example, when the average transmitting interval is 20 ms, and the average receiving interval is 200 ms, the quotient is 0.1, and a reciprocal of the quotient is 10. That is, data in which the to-be-transmitted data is used as a main transmission object may be split into 10 portions to be sequentially and uniformly transmitted.

Step 204: obtaining a plurality of data fragments based on a data size of the to-be-transmitted data and the splitting transmission number.

Based on step 203, this step is intended to finally obtain, by the executing body, the plurality of data fragments based on the data size of the to-be-transmitted data and the splitting transmission number. That is, each data fragment contains a portion of data to be transmitted subsequently, and all data fragments constitute the entire to-be-transmitted data.

It should be noted that all the to-be-transmitted data does not necessarily merely include the currently received to-be-transmitted data. If a portion of to-be-transmitted data received last time is still retained until being transmitted currently, the retained data should also be added, to prevent continuous accumulation of the retained data. Likewise, many possible reasons may cause an incomplete transmission of the to-be-transmitted data during last data transmission. An identical or a different reason may also cause new remaining data still to be remained in the current data transmission. Further, when this situation continues, targeted improvement measures may be proposed to avoid accumulating more and more remaining data.

Step 205: sequentially and uniformly transmitting the data fragments to a next-level node within a subsequent period with a duration being the average receiving interval.

Based on step 204, this step is intended to sequentially and uniformly transmit, by the executing body, the data fragments to the next-level node within the subsequent period with the duration being the average receiving interval. That is, assuming that the average receiving interval is 200 ms, and the data is split into 10 data fragments through step 203, one of the data fragments should be transmitted to the next-level node every 20 ms, until the transmission of all the 10 data fragments is completed at 200 ms.

In the data transmission method provided in the embodiment of the present disclosure and is applied to a first relay node, by computing an average receiving interval and an average transmitting interval based on actual historical data receiving and transmitting intervals, and then using a ratio of the average transmitting interval to the average receiving interval as the splitting transmission number to achieve a uniform transmission, thereby it is possible to sequentially and uniformly transmit a plurality of split data fragments within a predicted transmission duration served by the average receiving interval based on currently received to-be-transmitted data and the splitting transmission number. With the method, it is possible to correct the pulsed data transmission to a uniform data transmission, thereby improving the uniformity of data transmission, and reducing the probability of occurrence of data congestion.

Figure 3:
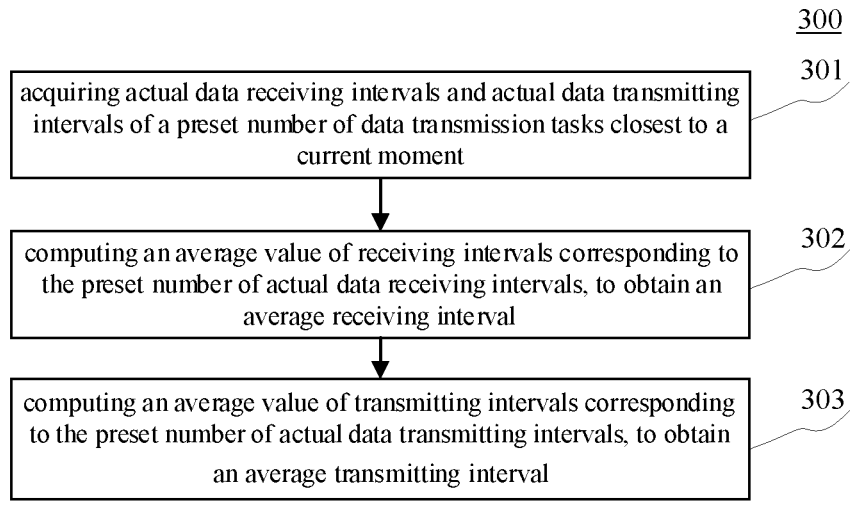
FIG. 3 is a flowchart of a method for determining an average receiving interval and an average transmitting interval provided in an embodiment of the present disclosure.

In order to improve the accuracy of the determined average receiving interval and average transmitting interval as far as possible, the present embodiment further provides a method for determining an average receiving interval and an average transmitting interval based on FIG. 3, the process 300 of which includes the following step 301 to step 303.

Step 301: acquiring actual data receiving intervals and actual data transmitting intervals of a preset number of data transmission tasks closest to a current moment.

The preset number may be set by oneself, such as 5 or 7. In addition, considering that different data transmission tasks have different task conditions, the average interval may be further determined by eliminating some extreme actual intervals that are significantly different from other data transmission tasks, to further improve the accuracy of a computing result.

Step 302: computing an average value of receiving intervals corresponding to the preset number of actual data receiving intervals, to obtain an average receiving interval.

Step 303: computing an average value of transmitting intervals corresponding to the preset number of actual data transmitting intervals, to obtain an average transmitting interval.

Step 302 to step 303 are approaches of averaging many actual data receiving intervals and averaging many actual data transmitting intervals, to finally obtain the average receiving interval and the average transmitting interval.

In addition to computing the average value by selecting several time intervals closest to the current moment based on the timeliness provided in the present embodiment, when the data transmission tasks are periodic, actual intervals of transmission tasks in the same historical period may be selected for computing. In general, the purpose is to flexibly select an implementation solution enabling the average interval to be more accurate based on actual situations.

Figure 4:
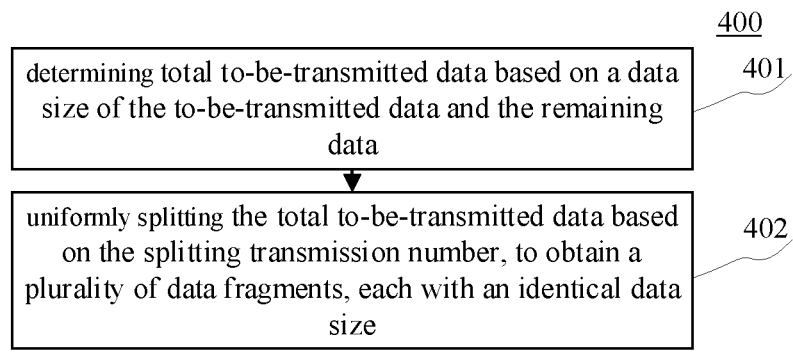
FIG. 4 is a flowchart of a method for obtaining a plurality of data fragments by splitting provided in an embodiment of the present disclosure.

Before the current transmission of the to-be-transmitted data is started, if there remains data that fails to be transmitted in a storage unit of the executing body, in order to avoid a gradual accumulation of remaining data as far as possible, the present embodiment further provides a method for obtaining a plurality of data fragments by splitting based on FIG. 4, the process 400 of which includes the following step 401 to step 402.

Step 401: determining total to-be-transmitted data based on a data size of the to-be-transmitted data and the remaining data.

Step 402: uniformly splitting the total to-be-transmitted data based on the splitting transmission number, to obtain a plurality of data fragments, each with an identical data size.

That is, based on current to-be-transmitted data, in step 401 to step 402, remaining data that fails to be transmitted in historical data transmission tasks is added, then a split object is determined as the total to-be-transmitted data, and the plurality of data fragments each with the identical data size are obtained by uniform data splitting, thereby avoiding data accumulation in the executing body as far as possible on the premise of guaranteeing the uniform transmission of the data size.

Based on any of the above embodiments, each data fragment in a single data transmission may have an upper limit in data size, i.e., the remaining data may also be generated because a data size of previous to-be-transmitted data is too large, such that a data size of each data fragment exceeds the upper limit. Therefore, in this case, if the data size of each data fragment exceeds a preset data size threshold, excess data exceeding the data size threshold may be retained as new remaining data for a next data transmission.

Further, if there is remaining data for a preset number (e.g., 3 or 5) of consecutive data transmissions and a data size of the retained remaining data shows an increasing trend (i.e., the data size of the remaining data retained each time is more and more), a request for increasing the data size threshold may be initiated. The request for increasing the data size threshold is initiated, because it is considered in the present embodiment that the reason for a continuous generation of remaining data is that a small data size threshold limits the data size of each data fragment, so that the data size threshold may be increased within a limited improvement range.

If a feedback of granting the request for increasing the data size threshold is returned, a current data size threshold is increased by a preset increase amount to obtain a new data size threshold, such that subsequent data transmissions are performed based on the new data size threshold as an upper limit of data size of each data fragment.

If the remaining data is continuously generated because of other factors, certain targeted adjustments may be further made within an allowable adjustment range, thereby eliminating the data accumulation as far as possible whilst guaranteeing the normal running of the executing body.

In order to deepen the understanding, the present disclosure will clarify, by comparing with an existing technical solution, how the technical solutions provided in the present disclosure will affect the data transmission process at the relay node, thereby achieving the effect of uniform data transmission, as shown in FIG. 5 to FIG. 8.

A relay node of a CDN substantially only implements a data forwarding function, i.e., directly forwards received data to a next relay node. Generally, a cache queue is set, and a data receiving coroutine continuously injects stream data to the tail of the queue, while a data transmitting coroutine continuously fetches data from the head of the queue, and transmits the fetched data (please refer to the data forwarding process shown in FIG. 5).

Figure 5:
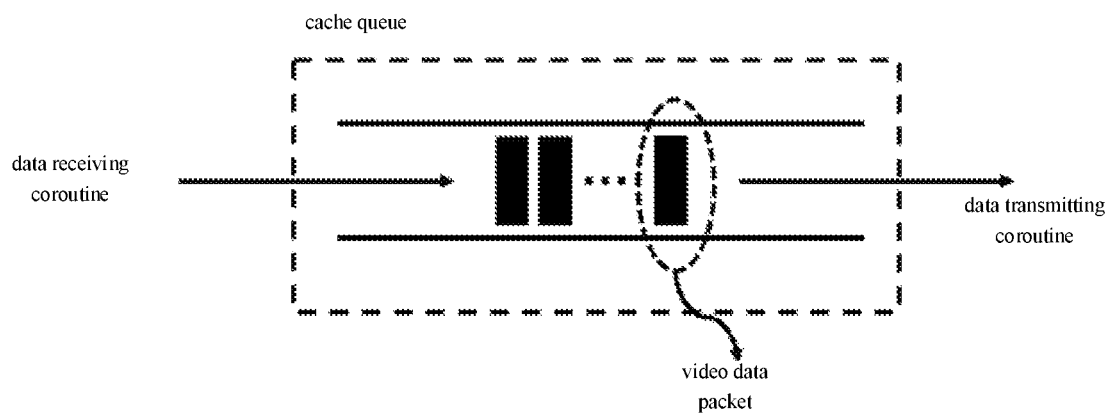
FIG. 5 is a schematic diagram of an existing data transmission process of a relay node.

In the existing technology as shown in FIG. 5, the relay node directly forwards the received data without processing, such that data received by the next data receiving node still possesses pulse features. The flow of such pulsed data across the whole network will cause several problems, thereby reducing the service quality, and increasing the costs.

In order to solve the above problems, the embodiment of the present disclosure processes pulsed stream data using a double-cache-queue mechanism, i.e., the data receiving coroutine continuously injects stream data to the tail of a cache queue 1, while the data transmitting coroutine continuously fetches data from the head of a cache queue 2, and transmits the fetched data. Further, a mechanism for transmitting data from the cache queue 1 to the cache queue 2 is used, and the magnitude of transmitted data is adaptively adjusted based on network conditions (please refer to the data forwarding process shown in FIG. 6). The data receiving coroutine will continuously add data to the cache queue 1 in a pulsed manner, i.e., add N data packets (N is undefined) every period T (T is not constant) to the queue; while the data transmitting coroutine will fetch data from the cache queue every period t, and then transmit the fetched data.

Figure 6:
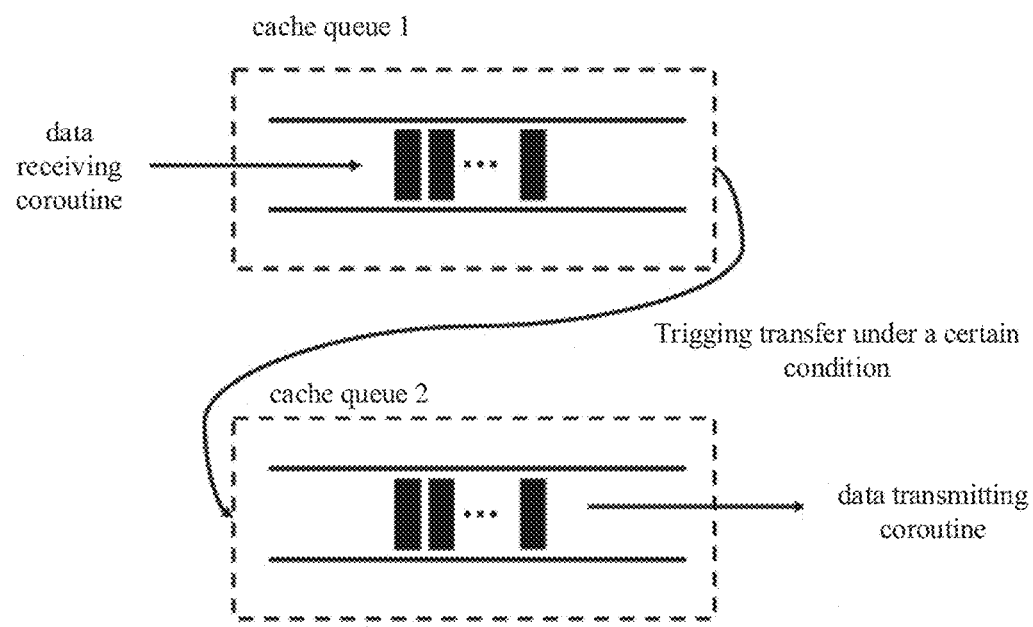
FIG. 6 is a schematic diagram of a data transmission process of a relay node using a solution provided in an embodiment of the present disclosure.
Figure 7:
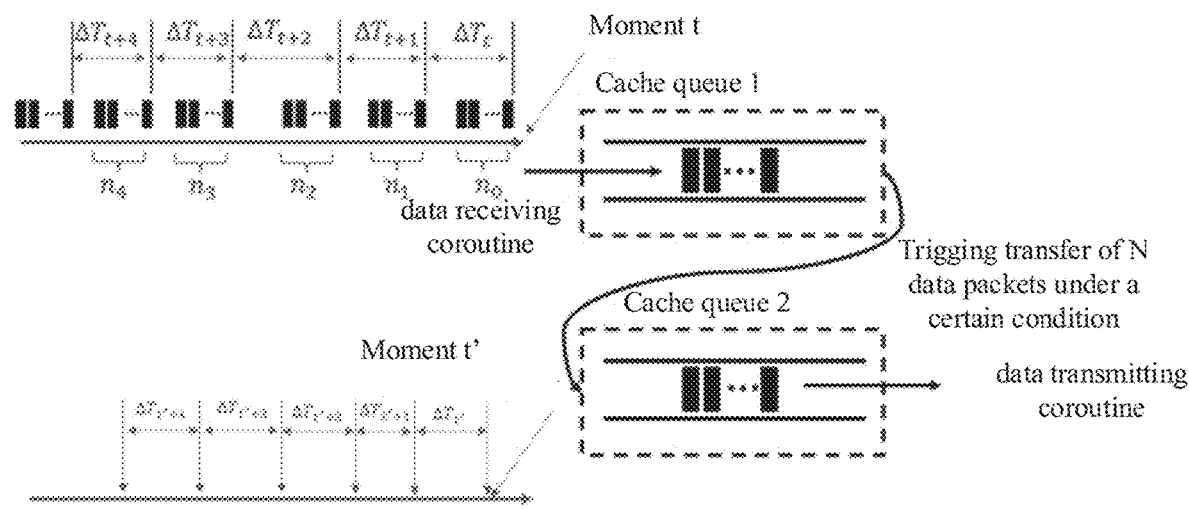
FIG. 7 is a detailed and expanded view of the schematic diagram shown in FIG. 6.

FIG. 7 further shows details of FIG. 6. It can be seen that FIG. 7 shows time intervals in the last 5 storages in the cache queue 1 through the data receiving coroutine, and time intervals in the last 5 trigger transfer to the cache queue 2, in order to use a ratio for the two types of last 5 time intervals (i.e., an average value of last 5 time intervals of a operation time during which the data transmitting coroutine attempts to transmit and an average value of last 5 time intervals brought by the pulsed data) as the splitting transmission number, and thus determine the number of data packets transmitted from the cache queue 1 to the cache queue 2 each time. Further, the number of data packets remaining in the cache queue 1 may be further considered to avoid the accumulation of data packets.

Figure 8:
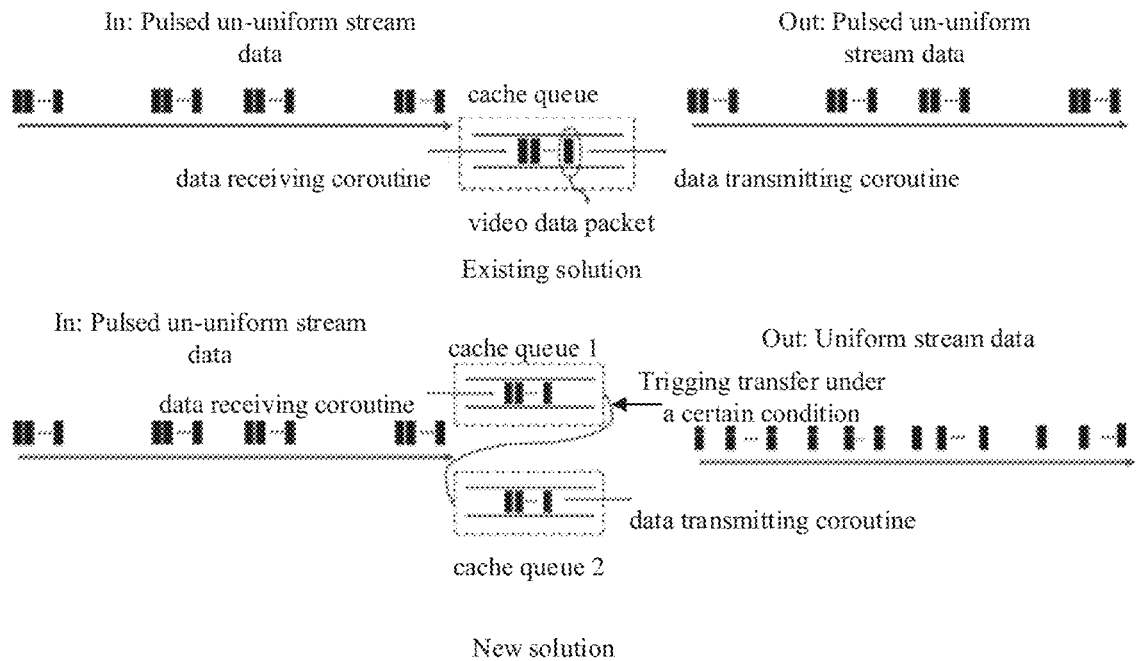
FIG. 8 is a comparison diagram of data transmission effects using the solutions shown in FIG. 5 and FIG. 6, respectively.

Finally, an upper portion and a lower portion of FIG. 8 show a comparison diagram of effects before and after a relay node forwards data in accordance with the old solution and the new solution, respectively. As can be obviously seen, the uniform processing obviously improves the uniformity of data transmitted from the relay node, thereby contributing to avoiding data congestion.

Figure 9:
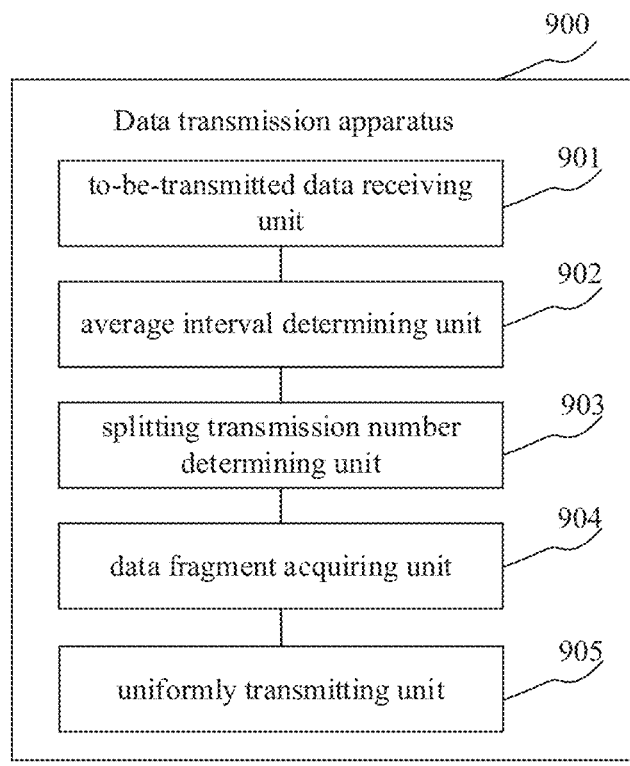
FIG. 9 is a structural block diagram of a data transmission apparatus provided in an embodiment of the present disclosure.

Further referring to FIG. 9, as an implementation of the method shown in the above figures, an embodiment of the present disclosure provides a data transmission apparatus. The embodiment of the apparatus corresponds to the embodiment of the method shown in FIG. 2, and the apparatus may be specifically applied to various electronic devices.

As shown in FIG. 9, the data transmission apparatus 900 in the present embodiment may include: a to-be-transmitted data receiving unit 901, an average interval determining unit 902, a splitting transmission number determining unit 903, a data fragment acquiring unit 904, and a uniformly transmitting unit 905. The to-be-transmitted data receiving unit 901 is configured to receive to-be-transmitted data currently transmitted from a data source node; the average interval determining unit 902 is configured to determine an average receiving interval and an average transmitting interval based on a historical data receiving interval and a historical data transmitting interval; the splitting transmission number determining unit 903 is configured to determine a splitting transmission number based on the average receiving interval and the average transmitting interval; the data fragment acquiring unit 904 is configured to obtain a plurality of data fragments based on a data size of the to-be-transmitted data and the splitting transmission number; and the uniformly transmitting unit 905 is configured to sequentially and uniformly transmit the data fragments to a next-level node in a subsequent period with a duration being the average receiving interval.

The related description of step 201 to step 205 in the corresponding embodiment of FIG. 2 may be referred to for specific processing of the to-be-transmitted data receiving unit 901, the average interval determining unit 902, the splitting transmission number determining unit 903, the data fragment acquiring unit 904, and the uniformly transmitting unit 905 in the data transmission apparatus 900 in the present embodiment and the technical effects thereof, respectively. The description will not be repeated here.

In some optional implementations of the present embodiment, the data fragment acquiring unit 904 may be further configured to:

determine, in response to determining that there remains data failing to be transmitted before transmitting the to-be-transmitted data, total to-be-transmitted data based on a data size of the to-be-transmitted data and the remaining data; and uniformly split the total to-be-transmitted data based on the splitting transmission number, to obtain a plurality of data fragments, each with an identical data size.

In some alternative implementations of the present embodiment, the data transmission apparatus 900 may further include:

an excess data retaining unit configured to retain, in response to a data size of each of the data fragments exceeding a preset data size threshold, excess data exceeding the data size threshold as new remaining data for a next data transmission.

In some alternative implementations of the present embodiment, the data transmission apparatus 900 may further include:

a threshold increase application initiating unit configured to initiate a request for increasing the data size threshold, in response to there being remaining data for a preset number of consecutive data transmissions and a data size of the remaining data showing an increasing trend; and a threshold increasing unit configured to increase, in response to receiving a feedback of granting the request for increasing the data size threshold, a current data size threshold by a preset increase amount to obtain a new data size threshold, such that subsequent data transmissions are performed based on the new data size threshold as an upper limit of data size of a data fragment.

In some alternative implementations of the present embodiment, the average interval determining unit 902 may be further configured to:

acquire actual data receiving intervals and actual data transmitting intervals of a preset number of data transmission tasks closest to a current moment;

compute an average value of receiving intervals corresponding to the preset number of actual data receiving intervals, to obtain the average receiving interval; and compute an average value of transmitting intervals corresponding to the preset number of actual data transmitting intervals, to obtain the average transmitting interval.

The present embodiment exists as an apparatus embodiment corresponding to the above method embodiment.

The data transmission apparatus that is provided in the embodiment of the present disclosure and is applied to a first relay node, where an average receiving interval and an average transmitting interval are by computing based on receiving and transmitting intervals of actual historical data, and then a ratio of the average transmitting interval to the average receiving interval is used as the splitting transmission number to achieve uniform transmission, to enable to sequentially and uniformly transmitting a plurality of split data fragments within a predicted transmission duration served by the average receiving interval based on currently received to-be-transmitted data and the splitting transmission number. With the technical solution, it is possible to correct pulsed data transmission to uniform data transmission, thereby improving the uniformity of data transmission, and reducing an occurrence probability of data congestion.

According to an embodiment of the present disclosure, the present disclosure further provides an electronic device, including: at least one processor; and a memory communicatively connected to the at least one processor; where the memory stores instructions executable by the at least one processor, and the instructions are executed by the at least one processor, such that the at least one processor can implement the data transmission method according to any one of the above embodiments.

According to an embodiment of the present disclosure, the present disclosure further provides a readable storage medium storing computer instructions, where the computer instructions are used for causing a computer to implement the data transmission method according to any one of the above embodiments.

According to an embodiment of the present disclosure, the present disclosure further provides a computer program product, where the computer program, when executed by a processor, can implement the data transmission method according to any one of the above embodiments.

Figure 10:
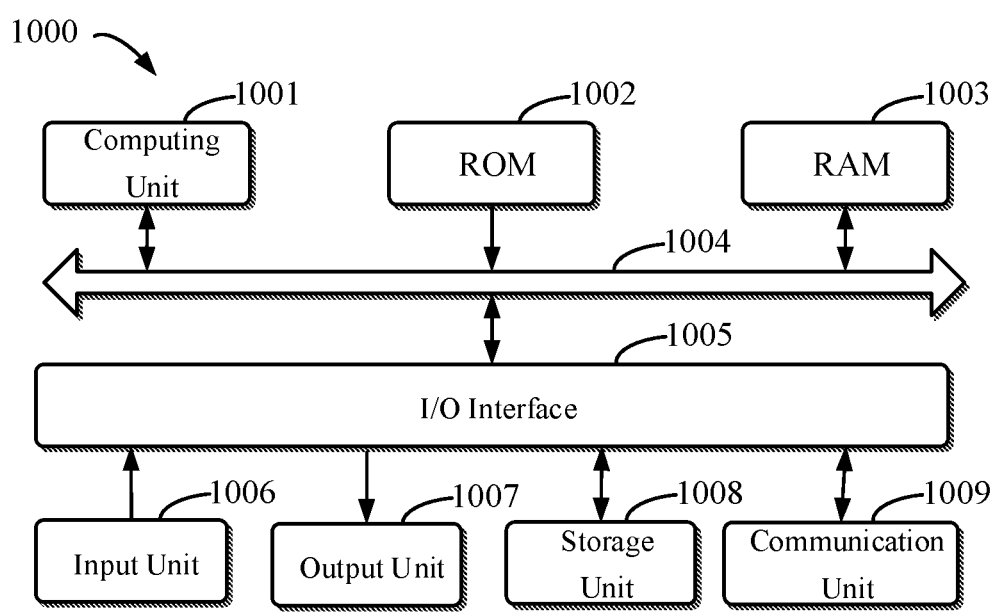
FIG. 10 is a schematic structural diagram of an electronic device adapted to executing the data transmission method provided in embodiments of the present disclosure.

FIG. 10 shows a schematic block diagram of an example electronic device 1000 that may be configured to implement embodiments of the present disclosure. The electronic device is intended to represent various forms of digital computers, such as a laptop computer, a desktop computer, a workbench, a personal digital assistant, a server, a blade server, a mainframe computer, and other suitable computers. The electronic device may further represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 10, the device 1000 includes a computing unit 1001, which may execute various appropriate actions and processes in accordance with a computer program stored in a read-only memory (ROM) 1002 or a computer program loaded into a random-access memory (RAM) 1003 from a storage unit 1008. The RAM 1003 may further store various programs and data required by operations of the device 1000. The computing unit 1001, the ROM 1002, and the RAM 1003 are connected to each other through a bus 1004. An input/output (I/O) interface 1005 is also connected to the bus 1004.

A plurality of components in the device 1000 is connected to the I/O interface 1005, including: an input unit 1006, such as a keyboard and a mouse; an output unit 1007, such as various types of displays and speakers; a storage unit 1008, such as a magnetic disk and an optical disk; and a communication unit 1009, such as a network card, a modem, and a wireless communication transceiver. The communication unit 1009 allows the device 1000 to exchange information/data with other devices via a computer network such as the Internet and/or various telecommunication networks.

The computing unit 1001 may be various general-purpose and/or special-purpose processing components having a processing power and a computing power. Some examples of the computing unit 1001 include, but are not limited to, a central processing unit (CPU), a graphics processing unit (GPU), various special-purpose artificial intelligence (AI) computing chips, various computing units running a machine learning model algorithm, a digital signal processor (DSP), and any appropriate processor, controller, microcontroller, and the like. The computing unit 1001 executes various methods and processes described above, such as the data transmission method. For example, in some embodiments, the data transmission method may be implemented as a computer software program that is tangibly included in a machine-readable medium, such as the storage unit 1008. In some embodiments, some or all of the computer programs may be loaded and/or installed onto the device 1000 via the ROM 1002 and/or the communication unit 1009. When the computer program is loaded into the RAM 1003 and executed by the computing unit 1001, one or more steps of the data transmission method described above may be executed. Alternatively, in other embodiments, the computing unit 1001 may be configured to execute the data transmission method by any other appropriate approach (e.g., by means of firmware).

Various implementations of the systems and technologies described above herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software, and/or a combination thereof. The various implementations may include: an implementation in one or more computer programs that are executable and/or interpretable on a programmable system including at least one programmable processor, which may be a special-purpose or general-purpose programmable processor, and may receive data and instructions from, and transmit data and instructions to, a storage system, at least one input apparatus, and at least one output apparatus.

Program codes for implementing the method of the present disclosure may be compiled using any combination of one or more programming languages. The program codes may be provided to a processor or controller of a general-purpose computer, a special-purpose computer, or other programmable data processing apparatuses, such that the program codes, when executed by the processor or controller, cause the functions/operations specified in the flow charts and/or block diagrams to be implemented. The program codes may be completely executed on a machine, partially executed on a machine, executed as a separate software package on a machine and partially executed on a remote machine, or completely executed on a remote machine or server.

In the context of the present disclosure, the machine-readable medium may be a tangible medium which may contain or store a program for use by, or used in combination with, an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any appropriate combination of the above. A more specific example of the machine-readable storage medium will include an electrical connection based on one or more pieces of wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of the above.

To provide interaction with a user, the systems and technologies described herein may be implemented on a computer that is provided with: a display apparatus (e.g., a CRT (cathode ray tube) or a LCD (liquid crystal display) monitor) configured to display information to the user; and a keyboard and a pointing apparatus (e.g., a mouse or a trackball) by which the user can provide an input to the computer. Other kinds of apparatuses may be further configured to provide interaction with the user. For example, a feedback provided to the user may be any form of sensory feedback (e.g., visual feedback, auditory feedback, or haptic feedback); and an input may be received from the user in any form (including an acoustic input, a voice input, or a tactile input).

The systems and technologies described herein may be implemented in a computing system (e.g., as a data server) that includes a back-end component, or a computing system (e.g., an application server) that includes a middleware component, or a computing system (e.g., a user computer with a graphical user interface or a web browser through which the user can interact with an implementation of the systems and technologies described herein) that includes a front-end component, or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and usually interact via a communication network. The relationship between the client and the server arises by virtue of computer programs that run on corresponding computers and have a client-server relationship with each other. The server may be a cloud server, is also known as a cloud computing server or a cloud host, and is a host product in a cloud computing service system to solve the defects of difficult management and weak service extendibility existing in conventional physical hosts and virtual private servers (VPS).

The technical solution provided in embodiments of the present disclosure obtains an average receiving interval and an average transmitting interval by computing based on actual historical data receiving and transmitting intervals, and then uses a ratio of the average transmitting interval to the average receiving interval as the splitting transmission number to achieve uniform transmission, thereby sequentially and uniformly transmitting a plurality of split data fragments within a predicted transmission duration served by the average receiving interval based on currently received to-be-transmitted data and the splitting transmission number. The technical solution corrects pulsed data transmission to uniform data transmission, thereby improving the uniformity of data transmission, and reducing the probability of occurrence of data congestion.

It should be understood that the various forms of processes shown above may be used to reorder, add, or delete steps. For example, the steps disclosed in the present disclosure may be executed in parallel, sequentially, or in different orders, as long as the desired results of the technical solutions disclosed in the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A data transmission method, comprising:
   receiving to-be-transmitted data currently transmitted from a data source node;
   determining an average receiving interval and an average transmitting interval based on a historical data receiving interval and a historical data transmitting interval;
   determining a splitting transmission number based on the average receiving interval and the average transmitting interval;
   obtaining a plurality of data fragments based on a data size of the to-be-transmitted data and the splitting transmission number; and
   sequentially and uniformly transmitting the data fragments to a next-level node within a subsequent period with a duration being the average receiving interval.

2. The method according to claim 1, wherein obtaining the plurality of data fragments based on the data size of the to-be-transmitted data and the splitting transmission number comprises:
   determining, in response to determining that there remains data failing to be transmitted before transmitting the to-be-transmitted data, total to-be-transmitted data based on a data size of the to-be-transmitted data and the remaining data; and
   uniformly splitting the total to-be-transmitted data based on the splitting transmission number, to obtain a plurality of data fragments, each with an identical data size.

3. The method according to claim 2, wherein the method further comprises:
   retaining, in response to a data size of each of the data fragments exceeding a preset data size threshold, excess data exceeding the data size threshold as new remaining data for a next data transmission.

4. The method according to claim 3, wherein the method further comprises:
   initiating a request for increasing the data size threshold, in response to there being remaining data for a preset number of consecutive data transmissions and a data size of the remaining data showing an increasing trend; and
   increasing, in response to receiving a feedback of granting the request for increasing the data size threshold, a current data size threshold by a preset increase amount to obtain a new data size threshold, such that subsequent data transmissions are performed based on the new data size threshold as an upper limit of data size of a data fragment.

5. The method according to claim 1, wherein determining the average receiving interval and the average transmitting interval based on the historical data receiving interval and the historical data transmitting interval comprises:
   acquiring actual data receiving intervals and actual data transmitting intervals of a preset number of data transmission tasks closest to a current moment;
   computing an average value of receiving intervals corresponding to the preset number of actual data receiving intervals, to obtain the average receiving interval; and
   computing an average value of transmitting intervals corresponding to the preset number of actual data transmitting intervals, to obtain the average transmitting interval.

6. The method according to claim 2, wherein determining the average receiving interval and the average transmitting interval based on the historical data receiving interval and the historical data transmitting interval comprises:
   acquiring actual data receiving intervals and actual data transmitting intervals of a preset number of data transmission tasks closest to a current moment;
   computing an average value of receiving intervals corresponding to the preset number of actual data receiving intervals, to obtain the average receiving interval; and
   computing an average value of transmitting intervals corresponding to the preset number of actual data transmitting intervals, to obtain the average transmitting interval.

7. The method according to claim 3, wherein determining the average receiving interval and the average transmitting interval based on the historical data receiving interval and the historical data transmitting interval comprises:
   acquiring actual data receiving intervals and actual data transmitting intervals of a preset number of data transmission tasks closest to a current moment;
   computing an average value of receiving intervals corresponding to the preset number of actual data receiving intervals, to obtain the average receiving interval; and
   computing an average value of transmitting intervals corresponding to the preset number of actual data transmitting intervals, to obtain the average transmitting interval.

8. The method according to claim 4, wherein determining the average receiving interval and the average transmitting interval based on the historical data receiving interval and the historical data transmitting interval comprises:
   acquiring actual data receiving intervals and actual data transmitting intervals of a preset number of data transmission tasks closest to a current moment;
   computing an average value of receiving intervals corresponding to the preset number of actual data receiving intervals, to obtain the average receiving interval; and
   computing an average value of transmitting intervals corresponding to the preset number of actual data transmitting intervals, to obtain the average transmitting interval.

9. A data transmission apparatus, comprising:
   at least one processor; and
   a memory storing instructions, wherein the instructions when executed by the at least one processor, cause the at least one processor to perform operations, the operations comprising:
   receiving to-be-transmitted data currently transmitted from a data source node;

determining an average receiving interval and an average transmitting interval based on a historical data receiving interval and a historical data transmitting interval;

determining a splitting transmission number based on the average receiving interval and the average transmitting interval;

obtaining a plurality of data fragments based on a data size of the to-be-transmitted data and the splitting transmission number; and sequentially and uniformly transmitting the data fragments to a next-level node in a subsequent period with a duration being the average receiving interval.

10. The apparatus according to claim 9, wherein obtaining the plurality of data fragments based on the data size of the to-be-transmitted data and the splitting transmission number comprises:

determining, in response to determining that there remains data failing to be transmitted before transmitting the to-be-transmitted data, total to-be-transmitted data based on a data size of the to-be-transmitted data and the remaining data; and uniformly splitting the total to-be-transmitted data based on the splitting transmission number, to obtain a plurality of data fragments, each with an identical data size.

11. The apparatus according to claim 10, wherein the operations further comprise:

retaining, in response to a data size of each of the data fragments exceeding a preset data size threshold, excess data exceeding the data size threshold as new remaining data for a next data transmission.

12. The apparatus according to claim 11, wherein the operations further comprise:

initiating a request for increasing the data size threshold, in response to there being remaining data for a preset number of consecutive data transmissions and a data size of the remaining data showing an increasing trend; and increasing, in response to receiving a feedback of granting the request for increasing the data size threshold, a current data size threshold by a preset increase amount to obtain a new data size threshold, such that subsequent data transmissions are performed based on the new data size threshold as an upper limit of data size of a data fragment.

13. The apparatus according to claim 9, wherein determining the average receiving interval and the average transmitting interval based on the historical data receiving interval and the historical data transmitting interval comprises:

acquiring actual data receiving intervals and actual data transmitting intervals of a preset number of data transmission tasks closest to a current moment;

computing an average value of receiving intervals corresponding to the preset number of actual data receiving intervals, to obtain the average receiving interval; and computing an average value of transmitting intervals corresponding to the preset number of actual data transmitting intervals, to obtain the average transmitting interval.

14. The apparatus according to claim 10, wherein determining the average receiving interval and the average transmitting interval based on the historical data receiving interval and the historical data transmitting interval comprises:

acquiring actual data receiving intervals and actual data transmitting intervals of a preset number of data transmission tasks closest to a current moment;

computing an average value of receiving intervals corresponding to the preset number of actual data receiving intervals, to obtain the average receiving interval; and computing an average value of transmitting intervals corresponding to the preset number of actual data transmitting intervals, to obtain the average transmitting interval.

15. The apparatus according to claim 11, wherein determining the average receiving interval and the average transmitting interval based on the historical data receiving interval and the historical data transmitting interval comprises:

acquiring actual data receiving intervals and actual data transmitting intervals of a preset number of data transmission tasks closest to a current moment;

computing an average value of receiving intervals corresponding to the preset number of actual data receiving intervals, to obtain the average receiving interval; and computing an average value of transmitting intervals corresponding to the preset number of actual data transmitting intervals, to obtain the average transmitting interval.

16. A non-transitory computer readable storage medium storing computer instructions, wherein the computer instructions are used for causing the computer to execute operations comprising:

receiving to-be-transmitted data currently transmitted from a data source node;

determining an average receiving interval and an average transmitting interval based on a historical data receiving interval and a historical data transmitting interval;

determining a splitting transmission number based on the average receiving interval and the average transmitting interval;

obtaining a plurality of data fragments based on a data size of the to-be-transmitted data and the splitting transmission number; and sequentially and uniformly transmitting the data fragments to a next-level node within a subsequent period with a duration being the average receiving interval.

17. The non-transitory computer readable storage medium according to claim 16, wherein obtaining the plurality of data fragments based on the data size of the to-be-transmitted data and the splitting transmission number comprises:

determining, in response to determining that there remains data failing to be transmitted before transmitting the to-be-transmitted data, total to-be-transmitted data based on a data size of the to-be-transmitted data and the remaining data; and uniformly splitting the total to-be-transmitted data based on the splitting transmission number, to obtain a plurality of data fragments, each with an identical data size.

18. The non-transitory computer readable storage medium according to claim 17, wherein the operations further comprise:

retaining, in response to a data size of each of the data fragments exceeding a preset data size threshold, excess data exceeding the data size threshold as new remaining data for a next data transmission.

19. The non-transitory computer readable storage medium according to claim 18, wherein the operations further comprise:

initiating a request for increasing the data size threshold, in response to there being remaining data for a preset number of consecutive data transmissions and a data size of the remaining data showing an increasing trend; and increasing, in response to receiving a feedback of granting the request for increasing the data size threshold, a current data size threshold by a preset increase amount to obtain a new data size threshold, such that subsequent data transmissions are performed based on the new data size threshold as an upper limit of data size of a data fragment.

20. The non-transitory computer readable storage medium according to claim 16, wherein determining the average receiving interval and the average transmitting interval based on the historical data receiving interval and the historical data transmitting interval comprises:
  acquiring actual data receiving intervals and actual data transmitting intervals of a preset number of data transmission tasks closest to a current moment;
  computing an average value of receiving intervals corresponding to the preset number of actual data receiving intervals, to obtain the average receiving interval; and
  computing an average value of transmitting intervals corresponding to the preset number of actual data transmitting intervals, to obtain the average transmitting interval.

* * * * *